Nov. 9, 1926.
M. DE GROOTE
1,606,699
PROCESS FOR BREAKING PETROLEUM EMULSIONS
Filed April 29, 1926
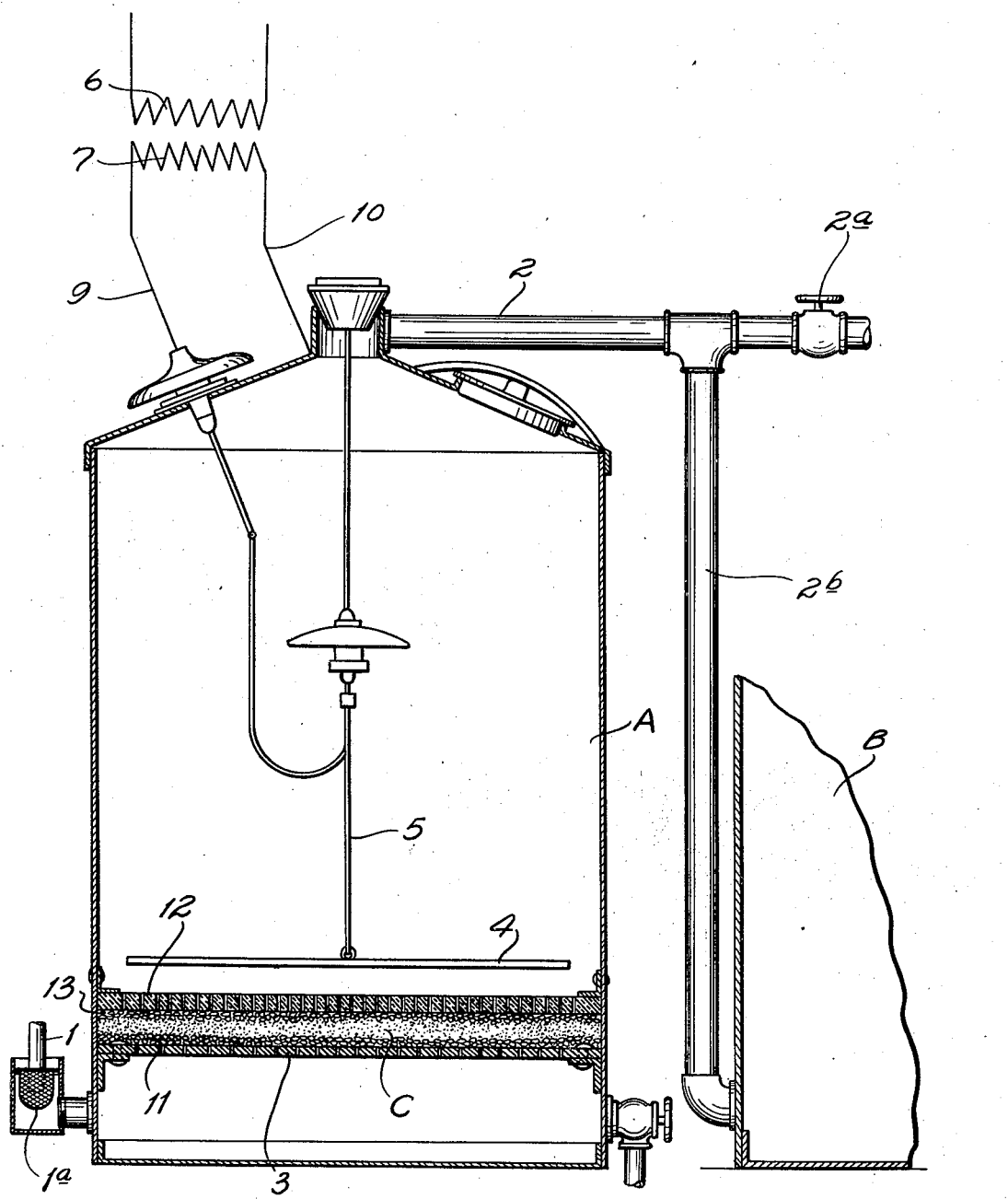
INVENTOR:
MELVIN DE GROOTE.
By Bakewell Church
ATTORNEYS Patented Nov. 9, 1926.

1,606,699

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

PROCESS FOR BREAKING PETROLEUM EMULSIONS.

Application filed April 29, 1926. Serial No. 105,441.

This invention relates to the treatment of emulsions of mineral oil and water, such as petroleum emulsions, for the purpose of breaking the emulsion, and thus causing or permitting the oil to separate from the water.

Petroleum emulsions are of the water-in-oil type and comprise fine droplets of natural occurring waters or brines dispersed in a more or less permanent state throughout the oil which constitutes the continuous phase of the emulsion. They are obtained from producing wells and from the bottoms of storage tanks and are commonly referred to as "cut oil", "roily oil", "emulsified oil", "bottom settlings", etc.

One object of my present invention is to provide a novel and inexpensive process for separating emulsions of the kind referred to into their component parts of oil and water or brine so as to obtain merchantable oil that will be accepted by pipe line companies.

Another object of my invention is to provide an apparatus of novel construction for practising my said process.

One process that is now used for breaking emulsions of the kind referred to, known commercially as the electrical dehydration process, employs a means for subjecting the emulsion to electrical tension for the purpose of agglomerating the water into large masses which tend to separate from the oil. I have discovered that petroleum emulsions of the water-in-oil type can be broken economically and more effectively than is possible with a conventional electrical dehydrator, if the emulsion is subjected to the action of a mechanical means which tends to distort the emulsifying films, and also subjected to electrical tension. Any suitable type or kind of electrical dehydrator can be used, such as a conventional electrical dehydrator of the Cottrell type constructed so as to deliver electric current at a potential difference of around 11,000 volts, or an electrical dehydrator employing a pulsating, alternating current, the peak voltage of which is a multiple, but at least the double, of the effective voltage, as described in U. S. Patent No. 1,570,209, to J. H. C. De Brey, dated January 19, 1926. Various means can also be used to mechanically distort the emulsifying films of the emulsion, but I prefer to pass the emulsion through a bed of sand or a mass of small particles, preferably, particles of non-absorbent, non-conducting material, that are separated from each other by spaces or voids approaching capillary dimensions. Preferably, the emulsion is subjected to electrical tension while it is passing through the bed that tends to distort the emulsifying films so as to cause the emulsion to be subjected simultaneously to the action of two separate and distinct means, both of which tend to cause the emulsion to break, and after being subjected to the above treatment, the treated liquid or product can be introduced into a settling tank, if necessary or desirable. When a sand bed or the like is used to distort the emulsifying films, it is desirable to pass the emulsion through a filtering device prior to passing it through said sand bed, so as to remove foreign matter in the emulsion that would tend to clog the sand bed.

The figure of the drawings is a diagrammatic vertical sectional view of my improved apparatus for breaking petroleum emulsions.

Said apparatus consists of an electrical dehydrator comprising a metal tank or container A provided at its lower end with an inlet pipe 1 through which the emulsion is introduced into same and provided at its upper end with a discharge pipe 2 through which the treated liquid escapes from the dehydrator. Said discharge pipe 2 is provided with an outlet valve 2ª and a branch 2ᵇ that leads to a settling tank B. In instances where it is necessary or desirable to have the treated liquid remain in a quiescent state after the electrical dehydrating action so as to cause the oil and water to separate by gravity, the valve 2ª is closed so as to direct the treated liquid into the settling tank B. As shown in the drawing, a filtering device 1ª is arranged in the emulsion supply pipe 1 so as to remove foreign matter from the emulsion before it passes through the bed that is used to distort the emulsifying films. The dehydrator is provided with a grounded perforated electrode 3 supported inside of and connected to the side wall of the container A, a live electrode 4 arranged above and in spaced relation to the grounded electrode, a rod 5 from which the live electrode 4 is suspended, a transformer provided with a primary 6 and a secondary 7 and a flexible wire 8 which leads to the rod 5 from one terminal 9 of the secondary 7, the other terminal 10 of said secondary being attached to the container A.

A bed C formed of sand or a mass of small, non-absorbent, non-conducting particles, separated from each other by spaces or voids approaching capillary dimensions, is arranged between the perforated, grounded electrode 3 and the live electrode 4 so as to produce a mechanical means that causes the emulsifying films of the emulsion to be subjected to distortion while the emulsion is traveling upwardly through the bed C. When the apparatus is in operation the emulsion is subjected to the simultaneous action of two agencies, one mechanical and one electrical, both of which tend to break or puncture the emulsifying films. Consequently, such a process will effectively break emulsions not amenable to treatment by the conventional electrical dehydrating process, and it materially reduces the time and cost of treating any petroleum emulsion by electrical dehydration.

Any suitable means can be used for confining the treating bed C in position, but I prefer to sustain said bed by the grounded electrode 3 which is constructed in the form of a perforated metal plate up through which the emulsion can pass. A layer 11 of coarse pebbles is preferably interposed between the perforated grounded electrode 3 and the treating bed C, and in order to hold said bed in a quiescent state while the emulsion is traveling upwardly through same, a perforated plate 12 of non-conducting material is arranged above the treating bed with a layer 13 of coarse pebbles interposed between the underside of said plate and the top side of the treating bed. By confining the treating bed between two perforated plates, as above described, the mass of small, non-absorbent, non-conducting particles that constitute the treating bed will remain in a quiescent state during the passage of the emulsion upwardly through the bed, thereby insuring voids or spaces in the treating bed that approach capillary dimensions.

Having thus described my invention, what I claim as new and desire to secure by Letters Patent is:

1. A process for breaking petroleum emulsions, characterized by passing the emulsion through a bed composed of small particles separated by voids approaching capillary proportions and simultaneously subjecting the emulsion to electrical dehydrating action.

2. A process for breaking petroleum emulsions, characterized by passing the emulsion through a bed composed of small, non-absorbent, non-conducting particles separated by voids approaching capillary proportions, and simultaneously subjecting the emulsion to electrical dehydrating action while it is passing through said bed.

3. A process for breaking petroleum emulsions, which consists in subjecting the emulsion to electrical dehydrating action while it is passing through a bed composed of small particles separated by voids approaching capillary proportions which tends to distort the emulsifying films, and thereafter causing the liquid to remain in a quiescent state so as to permit the water and oil to separate.

4. An apparatus for breaking petroleum emulsions, comprising a bed of small, non-absorbent, non-conducting particles separated by voids approaching capillary proportions, arranged so that the emulsion will travel through the same, and means for subjecting the emulsion to electrical tension while it is traveling through said bed.

5. An apparatus for breaking petroleum emulsions, comprising an electrical dehydrator, and a bed composed of small, non-absorbent, non-conducting particles separated by voids approaching capillary proportions, arranged between the electrodes of said dehydrator.

6. An apparatus for breaking petroleum emulsions, consisting of an electrical dehydrator provided with a live electrode and a perforated, grounded electrode, a bed formed by small, non-absorbent, non-conducting particles separated by voids approaching capillary proportions, sustained by said grounded electrode, and means for maintaining said bed in a quiescent state while the emulsion is traveling through same.

7. An apparatus for breaking petroleum emulsions, consisting of an electrical dehydrator provided with a live electrode and a perforated, grounded electrode, a bed formed by small, non-absorbent, non-conducting particles separated by voids approaching capillary proportions, sustained by said grounded electrode, and a perforated plate of non-conducting material arranged over said bed and co-operating with the grounded electrode to hold said bed in a quiescent state while the emulsion is traveling through the same.

MELVIN DE GROOTE.